US010167072B2

(12) United States Patent
    Scott

(10) Patent No.: US 10,167,072 B2
(45) Date of Patent: Jan. 1, 2019

(54) ATMOSPHERIC BALLOON DESCENT SYSTEM

(71) Applicant: Raven Industries, Inc., Sioux Falls, SD (US)

(72) Inventor: Randy E. Scott, Sulphur Springs, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 15/562,237

(22) PCT Filed: Mar. 26, 2016

(86) PCT No.: PCT/US2016/024381
    § 371 (c)(1),
    (2) Date: Sep. 27, 2017

(87) PCT Pub. No.: WO2016/160628
    PCT Pub. Date: Oct. 6, 2016

(65) Prior Publication Data
    US 2018/0105250 A1    Apr. 19, 2018

Related U.S. Application Data

(60) Provisional application No. 62/139,485, filed on Mar. 27, 2015.

(51) Int. Cl.
    *B64B 1/48*    (2006.01)
    *B64D 17/68*   (2006.01)
    (Continued)

(52) U.S. Cl.
    CPC .............. *B64B 1/48* (2013.01); *B64D 17/40* (2013.01); *B64D 17/68* (2013.01); *B64D 17/80* (2013.01)

(58) Field of Classification Search
    CPC .......... B64B 1/48; B64D 17/40; B64D 17/46; B64D 17/42; B64D 17/48; B64D 17/5064;
    (Continued)

(56) References Cited

U.S. PATENT DOCUMENTS 1,909,158 A    5/1933   Fredrik
3,079,113 A    2/1963   Meyer, Jr.
(Continued)

FOREIGN PATENT DOCUMENTS

FR            2752215 A1    2/1998
WO    WO-2016160628 A1   10/2016

OTHER PUBLICATIONS

Pagitz, M., et al., "Computation of Buckling Pressure of Pumpkin Balloons", *47th AIAA/ASCE/AHS/ASC Structures, Structural Dynamics, and Materials Conferences*, May 1-4, 2006, Newport, Rhode Island, (2006), 22 pgs.
(Continued)

*Primary Examiner* — Nicholas McFall
(74) *Attorney, Agent, or Firm* — Schwegman Lundberg & Woessner, P.A.

(57) ABSTRACT

An atmospheric balloon descent system includes a system housing having a drogue chamber containing a drogue chute and a parachute chamber containing a parachute. The parachute coupled with the drogue chute with a drogue tether. A riser tether extends between a descent system end portion and a balloon system end portion, and the descent system end portion is coupled with the parachute. A drogue cover release is coupled between the riser tether and the drogue cover. The descent system transitions between riser deployment and parachute deployment configurations. In the riser deployment configuration the system housing is decoupled from the atmospheric balloon system and the riser tether is deployed between the system housing and the atmospheric balloon system. In the parachute deployment configuration the deployed riser tether opens the drogue chamber and
(Continued)

deploys the drogue chute and the deployed drogue chute opens the parachute chamber and deploys the parachute.

25 Claims, 7 Drawing Sheets

(51) Int. Cl.
  *B64D 17/40* (2006.01)
  *B64D 17/80* (2006.01)
(58) Field of Classification Search
  CPC ........ B64D 17/66; B64D 17/68; B64D 17/74;
  B64D 17/80
  See application file for complete search history.

(56) References Cited

U.S. PATENT DOCUMENTS

| | | |
|---|---|---|
| 3,390,851 A | 7/1968 | Vee Mann |
| 3,614,031 A | 10/1971 | Demboski |
| 9,010,691 B1 | 4/2015 | Ratner et al. |
| 9,090,323 B1 | 7/2015 | Ratner |
| 9,604,726 B2 | 3/2017 | Fourie |
| 9,663,215 B1 | 5/2017 | Ratner |
| 9,676,468 B1 | 6/2017 | Roach |

OTHER PUBLICATIONS

Pagitz, M., et al., "Shape Optimization of "Pumpkin" Balloons", *AIAA Balloon Systems Conference*, May 21-24, 2007, (2007), 17 pgs.
"International Application Serial No. PCT/US2016/024381, International Search Report dated Jun. 21, 2016", 4 pgs.
"International Application Serial No. PCT/US2016/024381, Written Opinion dated Jun. 21, 2016", 5 pgs.
"International Application Serial No. PCT/US2016/024381, International Preliminary Report on Patentability dated Oct. 12, 2017", 7 pgs.

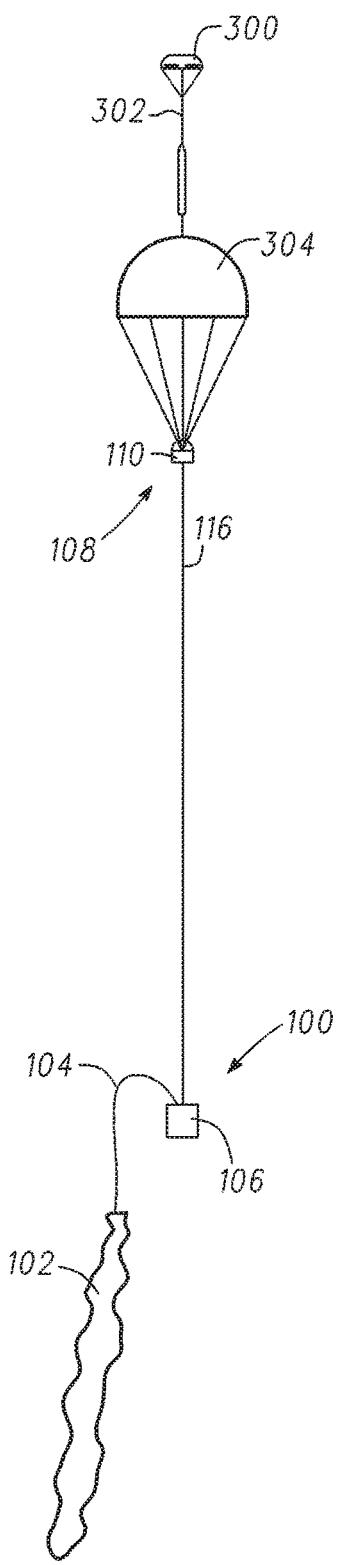
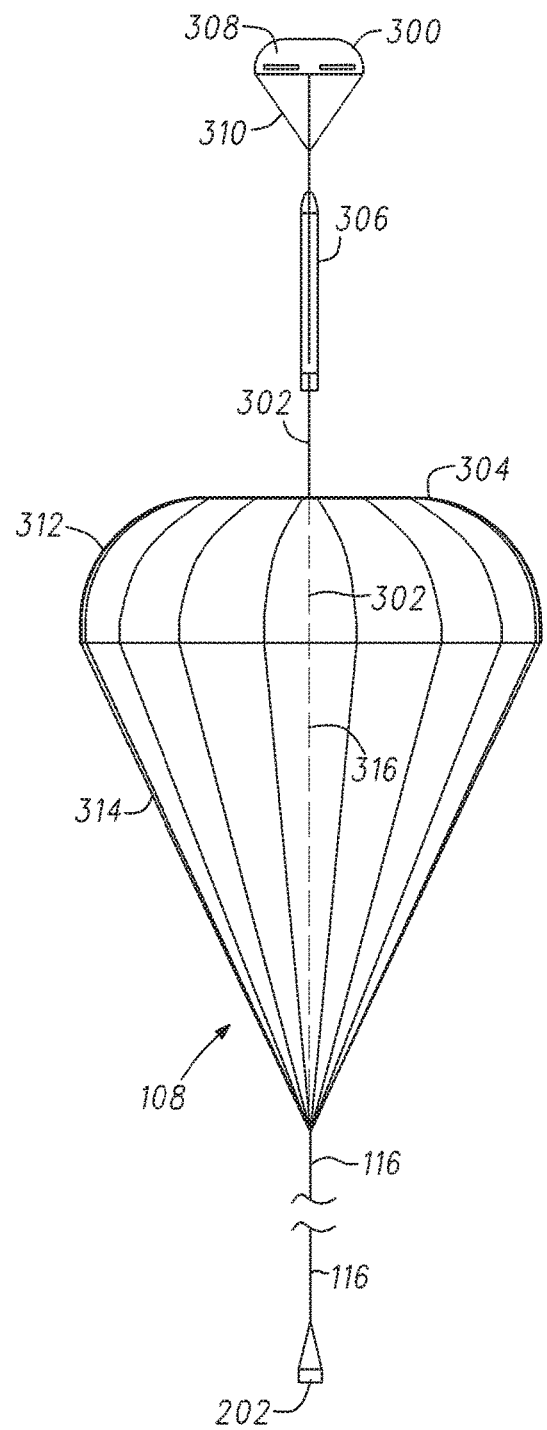
FIG. 3A
FIG. 3B

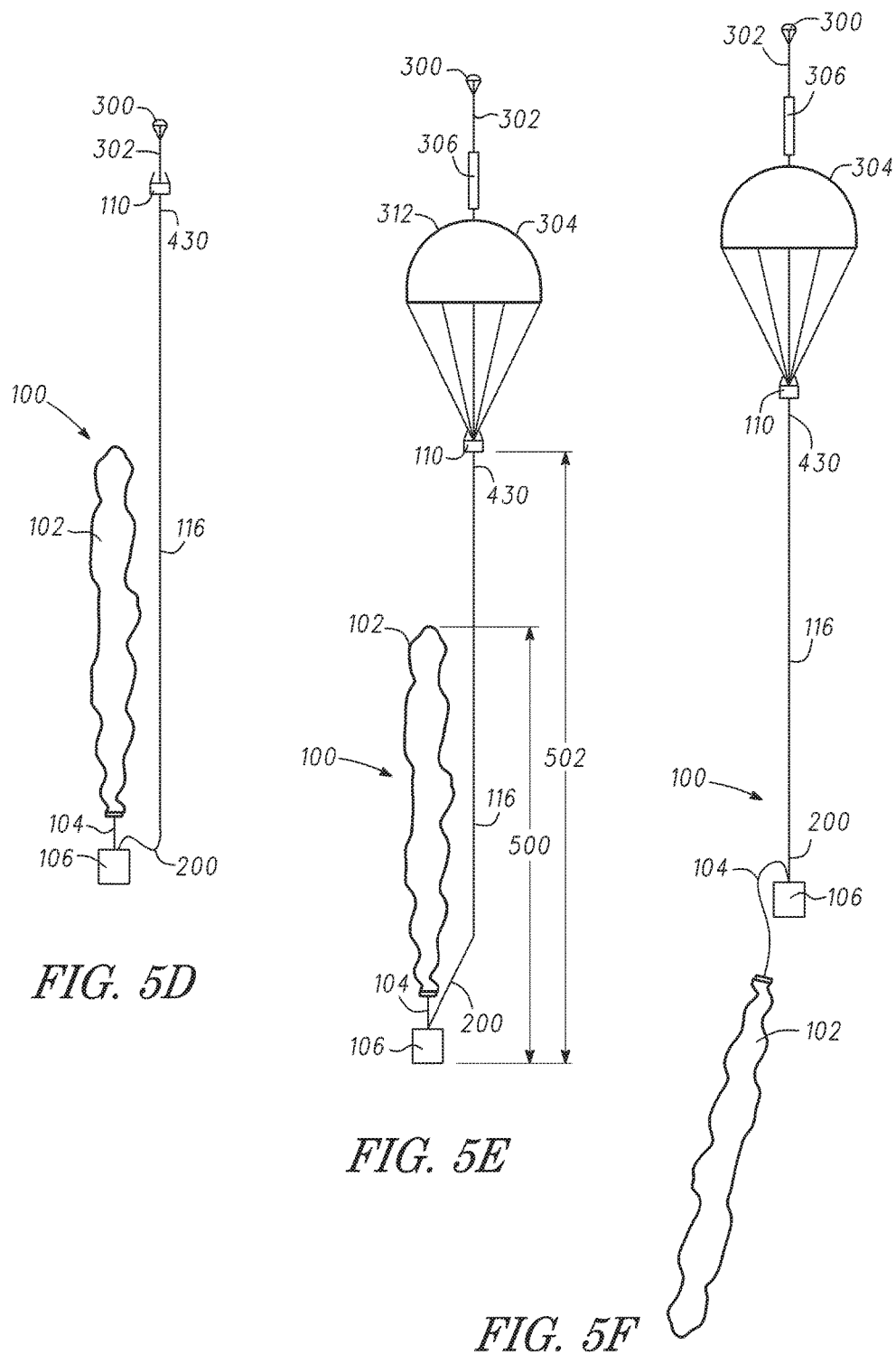

ATMOSPHERIC BALLOON DESCENT SYSTEM

CROSS-REFERENCE TO RELATED PATENT DOCUMENTS

This application is a U.S. national stage application filed under 35 U.S.C. § 371 from International Application Serial No. PCT/US2016/024381, which was filed 26 Mar. 2016, and published as WO2016/160628 on 6 Oct. 2016, and which claims priority under 35 U.S.C. § 119(e) to U.S. Provisional Patent Application No. 62/139,485, filed on Mar. 27, 2015, which application is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries; Sioux Falls, S. Dak.; All Rights Reserved.

TECHNICAL FIELD

This document pertains generally, but not by way of limitation, to atmospheric balloons and more specifically descent systems for use with the same.

BACKGROUND

Atmospheric balloons (e.g., weather, observation, telecommunication, service providing balloons or the like) lift and suspend payloads at altitudes including, but not limited to, 60,000 feet or more above sea level. Atmospheric balloons have operational lifetimes that end with the high altitude balloon returning to ground. In at least some circumstances control of when a high altitude balloon deflates and returns to ground is achieved with a deflation mechanism that initiates deflation of the high altitude balloon. Optionally, a system is included with the high altitude balloon to slow the descent of at least the payload coupled with the balloon and accordingly minimize damage to one or more of the payload, people and property (e.g., buildings, personal property or the like).

One example of a system to slow the descent of a balloon includes an assembly coupled with an atmospheric balloon having a parachute and a drogue chute or other deployment mechanism. The drogue chute and parachute are stored within a housing coupled with the tether extending between the balloon and the payload. When slowing of the descent of the deflating atmospheric balloon is desired the drogue chute is deployed (e.g., with a squib charge, actuator or the like). The deployed drogue chute fills and transmits drag to deploy the parachute from the housing. The descent of the payload and corresponding drag fills the parachute and accordingly slows the payload. In at least some examples the balloon is decoupled from the payload and the example descent system and descends separately.

OVERVIEW

The present inventors have recognized, among other things, that a problem to be solved can include slowing the descent of both a payload and drop vehicle (such as a balloon) and recovering of both of the payload and the drop vehicle together. For instance, with other descent systems the deflating atmospheric balloon is separated from the payload and the descent system to facilitate deployment of the parachute without interference from the balloon. If the atmospheric balloon is retained with the payload and the parachute the balloon may in some examples foul the deployment of the balloon. For instance, the balloon tangles with the parachute or suspension lines for the parachute. The payload and balloon, in some examples, then falls in an uncontrolled manner.

In an example, the present subject matter can provide a solution to this problem, such as by providing a descent system configured to slow the descent of both the payload and the atmospheric balloon and corresponding facilitate the recovering of both the payload and the balloon at the same location. The descent system includes a system housing including a parachute stored therein. The system housing is dropped from the balloon system (e.g., the payload or the atmospheric balloon) and descends below the balloon system. A riser tether is deployed, for instance from the system housing, to space the system housing away from the atmospheric balloon. In one example a drogue chute is deployed from the system housing and the descent system ascends relative to the payload and the atmospheric balloon through drag on the drogue chute. The riser tether suspends both the payload and the deflated (or deflating) atmospheric balloon therebelow and corresponding spaces the descent system and the parachute therein away from the balloon. The drogue chute pulls the parachute from the system housing. The parachute, elevated above the atmospheric balloon fills according to dynamic pressure (e.g., based on velocity of descent, drag, density of air at altitude and the like). The deployed parachute slows descent of the attached payload and the deflated balloon to facilitate recovery of the entirety of the balloon system (including the descent system).

The present inventors have recognized, among other things, that a problem to be solved can include minimizing fouling of a descent system during deployment. In some examples, a parachute is deployed from a balloon system including the balloon. The balloon, while deflated or in the process of deflating, is subject to whipping according to incident wind. The balloon membrane and the tethers coupling the balloon with the payload in some examples tangle with the deploying parachute and prevent or frustrate the proper deployment of the parachute. The balloon system, in some examples, thereafter descends unpredictably. For instance, the balloon membrane incidentally spreads or fills with air while tangled and causes unpredictable descent of the balloon system. In other examples, the parachute fails to deploy or only partially deploys and the balloon system descends too quickly.

This overview is intended to provide an overview of subject matter of the present patent application. It is not intended to provide an exclusive or exhaustive explanation of the disclosure. The detailed description is included to provide further information about the present patent application.

BRIEF DESCRIPTION OF THE DRAWINGS

The drawings, which are included throughout, illustrate generally, by way of example, but not by way of limitation, various embodiments discussed in the present document.

FIG. 3A is a schematic view of the atmospheric balloon system with the descent system in a deployed configuration.

FIG. 3B is a side view of the deployed drogue chute and parachute coupled with the drogue chute.

FIG. 5D is a schematic view of the atmospheric balloon system of FIG. 5A with the descent system at an elevated position relative to the atmospheric balloon and the payload.

FIG. 5E is a schematic view of the atmospheric balloon system of FIG. 5A with a parachute deployed above the atmospheric balloon and the payload.

FIG. 5F is a schematic view of the atmospheric balloon system of FIG. 5A with the parachute deployed and the atmospheric balloon and the payload are in a controlled descent.

DETAILED DESCRIPTION

Figure 1:
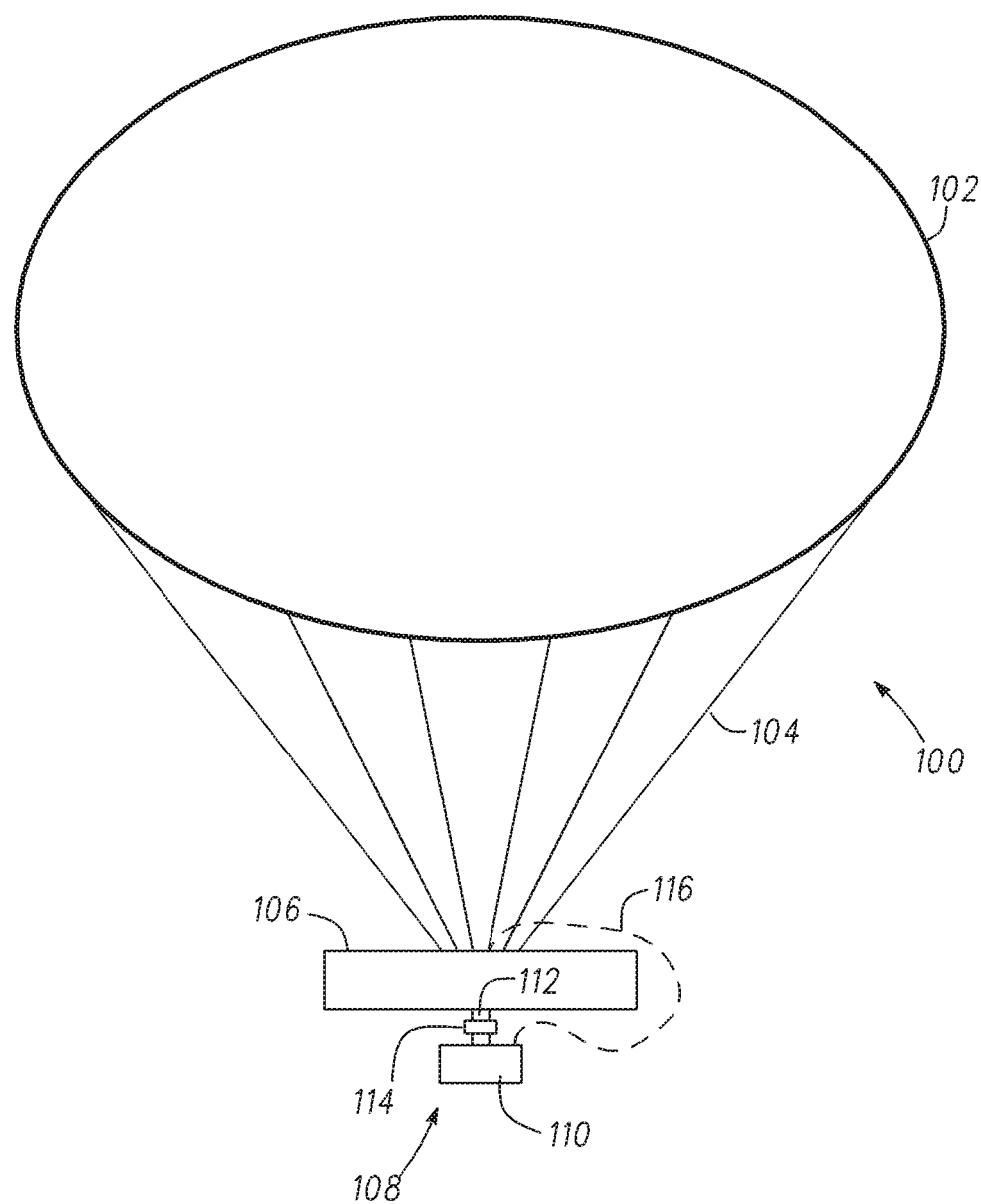
FIG. 1 is a schematic view of one example of an atmospheric balloon system including a descent system.

FIG. 1 shows one example of an atmospheric balloon system 100 including a descent system 108. As shown, the atmospheric balloon system 100 includes an atmospheric balloon 102 coupled with a payload 106. Suspension lines 104 extend between the atmospheric balloon 102 and the payload 106 and suspend the payload 106 beneath the balloon while in flight. In one example, the payload 106 includes, but is not limited to, instrumentation, control equipment, telecommunication equipment or the like. For instance, the payload 106 includes instruments configured to measure or observe one or more characteristics at altitude. In another example, the payload 106 includes optical or other observation instruments configured to observe objects within the viewable range of the instrumentation, for instance, terrain features, objects provided on land, sea, in the air or the like. In another example, the payload 106 includes one or more of telecommunication or wireless internet access equipment. For instance, the payload 106 facilitates the transmission and reception of one or more of wireless communications, internet access, online access, radio transmissions, video communications or the like.

In an example, the payload 106 includes lift gas reservoirs configured to supply lift gas to the atmospheric balloon 102 (e.g., a lift gas chamber of the balloon). In another example, the payload 106 includes ballast gas features including, but not limited to, one or more blowers, ballast gas chambers or the like configured to provide a ballast gas to the atmospheric balloon 102, such as a ballonet within the atmospheric balloon 102. The payload 106 optionally includes a controller configured to operate each of the features of the payload 106 including the ballast gas feature, lift gas reservoir or the like.

Referring again to FIG. 1, one example of the descent system 108 is shown as a schematic. The descent system 108 includes a system housing 110 suspended from the payload 106. In another example, the system housing 110 includes the system housing 110 suspended from the atmospheric balloon system 100 including one or more of the atmospheric balloon 102 or the payload 106. In the view shown in FIG. 1, the descent system 108 (e.g., the system housing 110) is suspended from the payload 106 with a payload harness 112. In an example, a system release mechanism 114 is coupled between the system housing 110 and the payload 106 along the payload harness 112. The system release mechanism 114 is configured to open the payload harness 112 and accordingly detach the system housing 110 from the payload 106 (or optionally the atmospheric balloon system 100). The system release mechanism 114 is, in one example, operated remotely, for instance by way of a radio or wireless instruction received by the payload 106 and conveyed to the system release mechanism 114. In another example, the system release mechanism 114 is configured to operate (e.g., open the payload harness) in an automated manner. For instance, the system release mechanism 114 or instruments on one or more of the descent system 108 or payload 106 are configured to measure at least one atmospheric balloon system characteristic including, but not limited to, one or more of descent velocity, air pressure, time sense initiation of deflation of the atmospheric balloon 102 or the like. In another example, a controller associated with the descent system 108 uses measurements of the one or more of the atmospheric balloon system characteristics and compares the same against thresholds to trigger operation of the system release mechanism 114 to release the system housing 110 and deploy the descent system 108.

As further shown in FIG. 1 in dashed lines, a riser tether 116 extends between the system housing 110 and the payload 106. In another example, the riser tether 116 is coupled with the atmospheric balloon system 100 including one or more of the atmospheric balloon 102, the payload 106 or one or more of the suspension lines 104 coupling the atmospheric balloon 102 with the payload 106. As will be described herein, the riser tether 116 is a deployable feature of the descent system 108 that is deployed as the system housing 110 moves away from the atmosphere balloon system 100 once the system housing 110 is detached from the remainder of the system 100. The riser tether 116 deploys the descent system 108 to position the system housing 110 as well as an onboard parachute stored within the system housing 110 away from the components of the atmospheric balloon system 100 including the atmospheric balloon 102. As will also be further described herein, the riser tether 116 facilitates the deployment of the parachute from the system housing 110 away from the atmospheric balloon 102 and the suspension lines 104. Tangling or fouling of the parachute as it is deployed is thereby avoided. Further, the parachute of the descent system 108 is reliably deployed and filled while spaced from the remainder of the atmospheric balloon system 100. That is to say, the suspension lines 104 and the atmospheric balloon 102 are spaced from the deploying parachute (while still tethered to the descent system 108) to facilitate deployment of the parachute as well as its filling to control the descent of the atmospheric balloon system 100 in a reliable and predictable manner.

Figure 2:
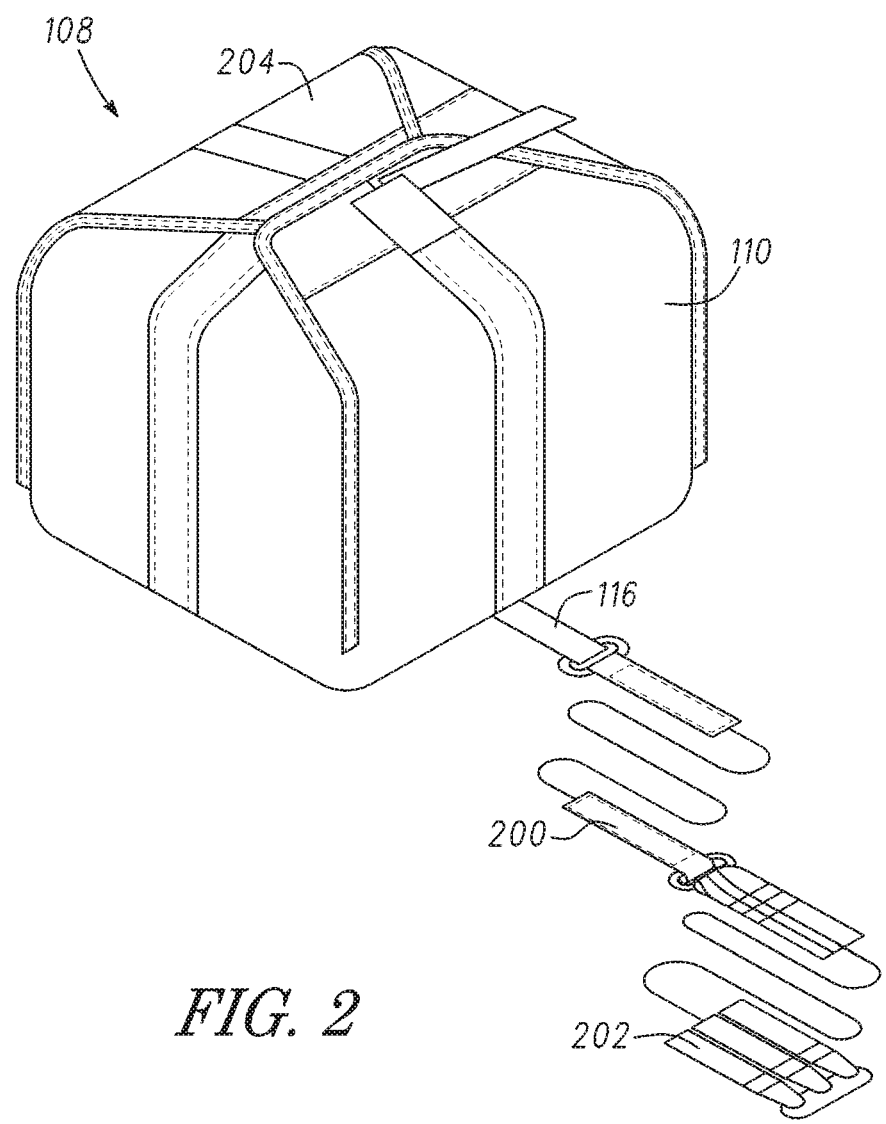
FIG. 2 is a perspective view of one example of a descent system in a stored configuration.

The descent system 108 previously shown in a schematic view in FIG. 1 is shown in perspective in FIG. 2. In one example, the descent system 108 includes the system housing 110 and the riser tether 116 previously described and shown in FIG. 1. The system housing 110 houses the components of the descent system 108 including the parachute 304 (described herein). The system housing is constructed with, but not limited to, nylon, canvas, polymer, metal or the like. In one example, the system housing 110 is a pliable enclosure (e.g., constructed with pliable nylon, polymers, canvas or the like) for one or more components of the descent system 108. In another example, the system housing 110 is a rigid or semi-rigid enclosure for one or more components of the system 108 (e.g., polymer, metal, composite disclosure or the like). In the example shown in FIG. 2, the system housing 110 includes one example of a drogue cover 204. As will be described herein, the drogue cover 204 closes a drogue chamber configured to receive and store a drogue chute therein. As will be further described herein, the drogue chute is coupled with the parachute of the descent system 108 and facilitates the reliable deployment of the parachute at a location spaced from the atmospheric balloon 102 its suspension lines 104 or the like.

The system housing 110, in one example stores a plurality of features therein. These features such as the drogue chute, the parachute and the riser tether are stored (e.g., stacked) to facilitate a staggered deployment of each of these features during operation of the descent system 108. Optionally, the system housing 110 includes a plurality of chambers such as a drogue chamber, a parachute chamber and a riser tether chamber configured to hold each of the drogue chute, parachute and respective riser tether therein. A cross-sectional view of one example of the system housing 110 is provided in FIG. 4 and described herein. Referring again to FIG. 2, the drogue cover 204 shown in FIG. 2, in one example, includes a plurality of flaps folded over the drogue chute and coupled together with a closure feature (described herein).

As further shown in FIG. 2, at least a portion of the riser tether 116 extends from the system housing 110. In another example, the riser tether 116 including a majority of the riser tether is stored with the descent system 108 (e.g., within the system housing 110 or along the system housing 110). The riser tether 116 shown in FIG. 2 (as opposed to the portion stored within or on the system housing 110) corresponds to the portion of the riser tether 116 shown in FIG. 1. As shown in FIG. 1, the riser tether 116 extends between the system housing 110 and the atmospheric balloon system 100 including, for instance, the payload 106. The riser tether 116, as will be described herein, is deployed by the descent system 108 to space the remaining components of the descent system 108 such as the system housing 110, drogue chute, parachute and the like away from the atmospheric balloon system 100 when a controlled descent of the atmospheric balloon system 100 is desired. The riser tether 116 when deployed by the descent system 108 includes a riser length that is greater than the composite length of the atmospheric balloon system 100. In one example, the composite length of the atmospheric balloon system 100 corresponds to a length measured between the atmospheric balloon 102, for instance from an upper apex of the atmospheric balloon in a deflated configuration, to the payload 106. Accordingly the riser tether 116 as described herein and shown in the figures spaces the descent system 108 including the system housing 110 away from both the atmospheric balloon 102, its suspension lines 104, as well as the payload 106 while keeping the descent system 108 tethered to the atmospheric balloon system 100. The drogue chute and parachute are thereby able to readily deploy without fouling caused by the suspension lines 104 or atmospheric balloon 102.

As further shown in FIG. 2, an optional payload interface 202 is coupled with the riser tether 116. A balloon system end portion 200 couples the riser tether 116 with the payload interface 202. The payload interface 202 provides a multi-point harness configured for coupling with one or more components of the atmospheric balloon system 100 including, for instance, the payload 106. In one example, the payload interface 202 ensures the payload 106 is maintained in a desired orientation (e.g., a horizontal orientation) during a controlled descent provided by the parachute included with the descent system 108.

FIGS. 3A and 3B show a deployed configuration for the descent system 108. The view shown in FIG. 3A shows the descent system 108 in combination with other portions of the atmospheric balloon system 100 including the atmospheric balloon 102 and the payload 106. FIG. 3B shows a detailed view of a portion of the deployed descent system 108 including a drogue chute 300 and a parachute 304 coupled with the atmospheric balloon system 100 by the riser tether 116.

Referring first to FIG. 3A, the atmospheric balloon system 100 is shown in a deflated configuration and suspended below the descent system 108 by the riser tether 116. As shown, the atmospheric balloon 102 is coupled with the payload 106 and remains so during descent of the atmospheric balloon system 100 with the descent system 108. For instance, the atmospheric balloon 102 remains coupled with the payload 106 with the suspension lines 104. As further shown in FIG. 3A, the descent system 108 is at an elevated position relative to the remainder of the atmospheric balloon system 100 including the atmospheric balloon 102 and the payload 106. As previously described, the riser tether 116 facilitates the spacing of the parachute 304 and the drogue chute 300 relative to the atmospheric balloon 102 and its suspension lines 104. As will be described further herein, deployment of the parachute 304 is conducted at an elevated position relative to the atmospheric balloon 102 (for instance, in a partially deflated configuration where the atmospheric balloon is relatively above the payload 106) to facilitate the deployment and filling of the parachute 304 without tangling or fouling with the atmospheric balloon 102 and the suspension lines 104.

Referring again to FIG. 3A, the descent system 108 shown includes the system housing 110 and the parachute 304 extending from the system housing 110. As will be described herein, the parachute 304 (as well as the drogue chute 300) are deployed from the system housing 110. The drogue chute 300 is shown coupled to the parachute 304 with a drogue tether 302. The drogue chute 300 is used to pull the parachute 304 from the system housing 110. In another example, the drogue chute 300 including, for instance, the drogue tether 302 is coupled with a parachute cover of the parachute chamber (shown in FIG. 4). The drogue tether 302, with deployment of the drogue chute 300, transmits drag forces to the parachute cover to accordingly open the parachute cover and the parachute chamber and thereby facilitate deployment of the parachute 304. The descent system 108 is configured to stagger the deployment of each of the drogue chute and the parachute 304 during descent of the atmospheric balloon system 100. The descent system 108 controls the deployment and filling of each of the drogue chute 300 and the parachute 304 to ensure reliable and consistent deployment of the parachute 304 without fouling, for instance, by the atmospheric balloon 102 or its suspension lines 104. Although shown in FIG. 3A as having a depressed canopy, the drogue chute 300 (and the parachute 304) includes, but is not limited to, one or more shapes including a parabolic shape, depressed shape, partially inverted shape used to achieve the depressed shape or the like.

Referring now to FIG. 3B, a detailed view of the descent system 108 including, for instance, the deployed parachute 304 and the drogue chute 300 is provided. The drogue chute 300 includes a drogue canopy 308 and suspension lines 310. As further shown, the drogue canopy 308 and the suspension lines 310 are coupled with the parachute 304 (as well as the remainder of the descent system 108) through a drogue tether 302. The drogue tether 302 is in turn coupled with the parachute 304 and facilitates the deployment of the parachute 304.

Referring again to FIG. 3B, the parachute 304 is shown interposed between the riser tether 116 and both of the drogue chute 300 and drogue tether 302 (the riser tether 116 is shown in a broken configuration for illustration purposes and has a length more closely approximated in FIG. 3A). The parachute 304 includes a parachute canopy 312 and a plurality of suspension lines 314 configured to couple the parachute canopy 312 with the riser tether 116. The riser tether 116, in one example, includes a two-part riser tether, for instance, a riser tether 116 is shown in FIG. 1 (and further shown in FIG. 4) as well as a parachute riser tether coupling the parachute 304 with the riser tether 116 as described herein (see FIG. 4). As shown in FIG. 3B, the parachute canopy 312 is deployed in an optional spread configuration. That is to say, the top of the parachute canopy 312 is depressed to bias the canopy 312 into a larger horizontal configuration. A center portion of the parachute canopy 312 is depressed downwardly, for instance by way of one or more canopy anchors 316 extending from one or more of the suspension lines 314 or the riser tether 116 to an apex or center portion of the parachute canopy 312. In one example, the canopy anchor 316 retains the inner portion of the parachute canopy 312 at a lower position (relative to an unconstrained parachute) to facilitate the spreading of the parachute canopy 312 laterally and thereby create a larger transverse surface area relative to the direction of descent of the atmospheric balloon system 100. The larger transverse surface area of the parachute canopy 312 increase drag and correspondingly further slows the descent of the atmospheric balloon system 100.

As further shown in FIG. 3B, in one example, a deployment sleeve 306 is coupled along the drogue tether 302. As will be described herein, the deployment sleeve 306 includes one or more of a sleeve, bag, diaper or the like configured to at least partially house the parachute 304 prior to its deployment. In one example, the deployment sleeve 306 includes the parachute 304 in a stowed configuration, for instance, the configuration shown in FIG. 4. In the stowed configuration, the parachute 304 is packed in the deployment sleeve 306 with the parachute canopy 312 provided at the upper (closed) end of the deployment sleeve 306 and the suspension lines 314 (as well as the canopy anchor 316) provided nearer to the opening of the deployment sleeve 306, for instance, the bottom portion of the deployment sleeve 306 shown in FIG. 3B. Accordingly, during parachute deployment the suspension lines 314 are deployed first from the deployment sleeve 306 and the parachute canopy 312 is then deployed to minimize tangling of the canopy with the suspension lines and ensure consistent and reliable deployment and filling of the parachute 304.

Figure 4:
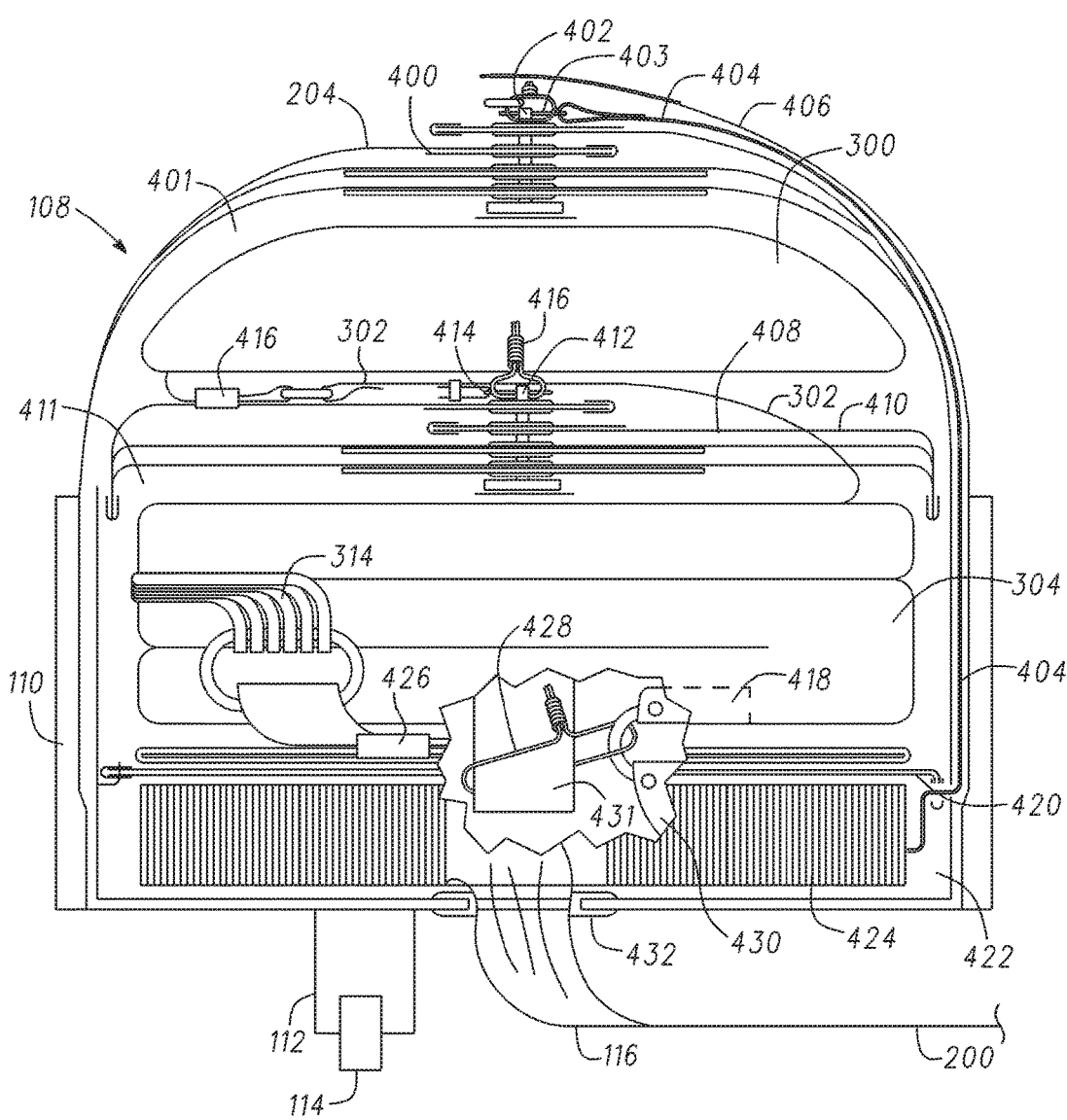
FIG. 4 is a cross sectional view of the descent system of FIG. 2.

FIG. 4 shows a cross-sectional view of one example of the descent system 108. As shown, the system housing 110 provides an enclosure for one or more components of the descent system 108 including, but not limited to, the drogue chute 300, the parachute 304 and at least a portion of the riser tether 116. As shown in FIG. 4, the riser tether 116 is stored within the system housing 110 within a riser tether chamber 422. Optionally, the riser tether 116 is stored as a riser spool 424. In another example, the riser tether 116 is coupled along the system housing 110, for instance in a layered configuration that unfolds from the system housing 110 during deployment of the riser tether 116.

Referring again to FIG. 4, one example of the payload harness 112 is shown coupled near the riser tether 116 on the system housing 110. The payload harness 112 further includes the release mechanism 114. Both of the payload harness and system release mechanism 112, 114 are also shown in FIG. 1. In use, the descent system 108 including the system housing 110 is suspended from the atmospheric balloon system 100 (see FIG. 1) by the payload harness 112. The system housing 110, when suspended by the payload harness 112, is inverted relative to the view shown in FIG. 4. When operation of the descent system 108 is desired the system housing is deployed, for instance, by operation of the release mechanism 114. The release mechanism includes one or more of an explosive squib, cutting mechanism, resistive heating element or the like configured to open the payload harness 112 (e.g., cut, melt, fracture the harness or the like) and accordingly allow for the detachment of the system housing 110 from the atmospheric balloon system 100 (while the riser tether 116 remains coupled).

Referring again to FIG. 4, the drogue chute 300 is shown positioned within a drogue chamber 401. For instance, the system housing 110 is provided with a drogue cover 204 extending over top of or across the drogue chute 300 to accordingly hold the drogue chute 300 within the drogue chamber 401. One example of the drogue cover 204 is shown in FIG. 2. As shown in FIG. 2 and shown again in FIG. 4, the drogue cover 204, in one example, includes one or more drogue flaps 400 extending over or across the drogue chamber 401 to enclose the drogue chamber 401 and hold the drogue chute 300 therein. In the example shown in FIG. 4 (and also FIG. 2), the drogue cover 204 includes a plurality of drogue flaps 400, in this example, four drogue flaps. The drogue flaps 400 optionally include one or more features to facilitate fastening. For instance, as shown in FIG. 4 in cross-section, each of the drogue flaps 400 includes an orifice (e.g., optionally surrounded with ring or grommet) to facilitate the passage of a drogue covere closure 402 therethrough. In one example, the drogue cover closure 402 is a loop of pliable material, for instance a nylon or canvas loop, configured to extend through the drogue flaps 400 and fasten the drogue flaps together. In one example, the drogue cover closure 402 is coupled with one of the drogue flaps 400. For instance, the drogue cover closure 402 is sewn into the bottom drogue flap 400 of the plurality of drogue flaps. As further shown in FIG. 4, a drogue release pin 403 is coupled with the drug cover closure 402. Removal of the drogue release pin 403 accordingly releases the drogue cover closure 402 and allows for opening of the drogue chamber 401 (e.g., by opening of the drogue flaps 400). As will be described herein, in one example, where the system housing 110 is detached from the payload 106 the descent of the system housing 110 and decoupling of the drogue release pin 403 from the drogue cover closure 402 allows gravity and momentum to deploy the drogue chute 300 from the drogue chamber 204. For instance, as the riser tether 116 reaches the termination of its deployment the system housing 110 stops its descent and the drogue chute 300 falls from the system housing 110 as it presses through and opens the drogue flaps 400.

As further shown, a drogue cover release 404 is coupled with the drogue release pin 403 and the drogue cover closure 402. Operation of the drogue cover release 404 (e.g., a ripcord, flexible element, tape or the like) opens the drogue chamber 401, for instance by removal of the drogue release pin 403 and opens the drogue cover closure 402 to facilitate the opening of the drogue flaps 400. As will be described herein, the drogue cover release 404 is, in one example coupled with the riser tether 116 and operated by the riser tether. As shown in FIG. 4, a drogue release channel 406 is optionally provided with the system housing 110 to facilitate the slideable passage and storage of the drogue cover release 404 on the system housing 110 between the drogue cover closure 402 and the riser tether 116.

As further shown in FIG. 4, the system housing 110 includes in another example a parachute chamber 411. The parachute chamber 411 is configured to store and deploy the parachute 304 therefrom. In one example, the parachute chamber 411, in a similar manner to the drogue chamber 401, includes a parachute cover 408 configured to extend over or across the parachute chamber 411 and thereby close the parachute chamber and retain the parachute 304 therein. Optionally, the parachute cover 408 includes one or more parachute cover flaps 410. In the example shown in FIG. 4, a plurality of parachute cover flaps 410 (e.g., four flaps) are provided. As shown, each of the parachute cover flaps 410 includes the parachute cover closure 412 extending therethrough. The parachute cover flaps 410 include orifices configured to receive the parachute cover closure 412. The parachute cover closure 412 is coupled with the parachute release pin 414 to close the parachute cover flaps 410 until opening of the parachute chamber 411 is triggered. The parachute cover closure 412, in one example, includes a nylon or canvas loop of material coupled with the bottommost parachute cover flap 410 and extending through each of the orifices. The parachute release pin 414 is coupled with the parachute cover closure 412 (extends through the loop in one example).

As further shown in FIG. 4, in another example the parachute release pin 414 is coupled with the drogue tether 302 that couples the drogue chute 300 with the parachute 304. In one example, the drogue tether 302 is retained in a stowed configuration after initial deployment of the drogue chute 300 to stagger (e.g., delay) deployment of the parachute 304. For instance, as shown in FIG. 4, the drogue tether 302 is held in place relative to the drogue chute 300 by one or more deployment shock absorbers 416. In the example shown in FIG. 4, a first deployment shock absorber 416 is provided by one or more of hook and loop material, rip stitching or the like between the drogue tether 302 and a parachute cover flap 410. In another example, the drogue tether 302 includes a deployment shock absorber 416 coupled between the parachute cover closure 412 and the parachute release pin 414.

During deployment of the drogue chute 300, the deployment shock absorbers 416 (whether alone or together) stagger the deployment of the parachute 304 relative to the initial deployment of the drogue chute 300. After deployment of the drogue chute 300 (during dropping of the system housing 110) the parachute 304 is held within the parachute chamber 411 because the drogue tether 302 is stayed from opening the parachute chamber 411 (one or more of the parachute cover flaps 410) by one or more of the deployment shock absorbers 416. When additional force is transmitted across the drogue tether 302 (for instance after elevation of the system housing 110 through drag incident on the drogue chute 300) the additional force overcomes the one or more deployment shock absorbers 416 and fractures the shock absorbers or causes them to fail. The drogue tether 302 (pulled by the drogue chute 300) opens the parachute cover 408 (e.g., by removing the parachute release pin 414 and opening of the parachute cover closure 412) and opens the parachute chamber 411 to facilitate the deployment of the parachute 304. The parachute 304 is then deployed at an elevated position relative to the remainder of the atmospheric balloon system 100 including the deflated or deflating atmospheric balloon 102 and payload 106 shown in FIG. 1. The one or more shock absorbers 416 are constructed to fail (e.g., open, fracture, break or the like) at specified forces provided by drag, shock loading or the like based on materials of construction, the structure of the absorbers such as length and width of the absorbers, number of plies (of rip stitching), density or number of shock absorbers or the like. Stated another way, the one or more shock absorbers 416 are configured to fail at one or more specified thresholds for drag force, dynamic shock force or the like. The configuration of the one or more shock absorbers assists in maintaining the parachute 304 within the parachute chamber 411 until the parachute is above the atmospheric balloon system 100 (including the balloon 102).

As further shown in FIG. 4, the parachute 304 includes the suspension lines 314 extending from the parachute 304 toward the riser tether 116. In one example, the riser tether 116 includes a parachute riser tether 418 providing an intermediate coupling between the parachute 304 and the remainder of the riser tether 116 (e.g., at the descent system riser end portion 430). As further shown in FIG. 4, the parachute riser tether 418 is optionally layered to facilitate the storage of the parachute riser tether 418 within the system housing 110. Optionally, a deployment shock absorber 426 (e.g., rip stitching, hook and loop material or the like) is provided along the parachute riser tether 418 to absorb shock, for instance, during deployment of the parachute 304, filling of the parachute and transmission of tension along the suspension lines 314 to the riser tether 116. The shock absorber 426 is fractured or fails with application of forces from the deployed parachute 304 and accordingly minimizes the transmission of forces along the riser tether 116, for instance to other connections, components or the like.

Referring again to FIG. 4, the riser tether 116 is shown in a spooled configuration as the riser spool 424 within the riser tether chamber 422. The riser tether 116 includes the riser spool 424 and the balloon system riser end portion 200 (configured to couple with the atmospheric balloon system 100) extending from the system housing 110. In one example, the riser tether 116 extends from the riser feeding orifice 432. The orifice 432 facilitates the deployment of the riser tether 116 when the system housing 110 is released from the atmospheric balloon system 100. The opposed end of the riser tether 116, the descent system riser end portion 430 is, in one example, coupled with the parachute riser tether 418 (e.g., near the center of the spool 424). In another example, the descent system riser end portion 430 is directly coupled with the suspension lines 314 of the parachute 304.

As further shown in FIG. 4, an optional spool plate 420 is provided between the riser tether 116 and the parachute 304 to maintain the riser tether 116 in a spool. Additionally, the spool plate 420 isolates the riser spool 424 and prevents (e.g., minimizes or eliminates) the fouling of the riser spool 424 with the suspension lines 314 of the parachute 304. In one example, the spool plate 420 includes an orifice or other passage therethrough to facilitate the delivery of the descent system riser end portion 430 and coupling of the same with the parachute riser tether 418. In another example, a gap is provided between the spool plate 420 and the remainder of the system housing 110 to facilitate the passage of the descent system riser end portion 430 and coupling with the parachute 304 (e.g., the parachute riser tether 418).

As further shown in FIG. 4, the riser tether 116 is coupled with the drogue cover release 404. As previously described, the drogue cover release 404 extends through the descent system 108 (e.g., the system housing 110) and is coupled with the drogue cover closure 402, for instance by the drogue release pin 403. Optionally, the drogue cover release 404 is laced through a portion of the spool plate 420 and coupled with the riser tether 116. In one example, and as further described herein, the drogue cover release 404 is coupled with a portion of the riser tether 116 nearer to the descent system riser end portion 430 in comparison to the balloon system riser end portion 200. Accordingly, the drogue cover release 404 is operated after the riser tether 116 is deployed fully or near fully from the system housing 110 (e.g., through the riser feeding orifice 432). As the riser tether 116 is deployed from the system housing 110, the portion of the riser tether 116 coupled with the drogue cover release 404 is pulled or moved and moves (pulls) the drogue cover release 404. Movement of the drogue cover release 404 correspondingly operates the drogue release pin 403 at the drogue cover closure 402. Stated another way, the riser tether 116 when deployed from the system housing 110 initiates deployment or operation of other components of the descent system 108 including the drogue cover closure 402 and the drogue chute 300.

In another example, a deployment shock absorber 428 is coupled with the riser tether 116 to absorb and attenuate forces transmitted along one or more of the riser tether 116 and the parachute riser tether 418. In the example shown in FIG. 4, the deployment shock absorber 428 includes, but is not limited to, a filament, ribbon or the like coupled with an interface between the parachute riser tether 418 and the riser tether 116. As shown, the interface includes a ring, carabiner or the like between the tethers 418, 116 and coupled with a shock absorber anchor 431 by way of the deployment shock absorber 428. In one example, a shock absorber anchor 431 is coupled with the system housing 110 (or other relatively static feature of the system 108). The shock absorber includes, but is not limited to, a loop of pliable material such as a nylon loop, canvas loop or the like. The shock absorber anchor 431 holds the deployment shock absorber 428 and the interface between the parachute riser tether 418 and the riser tether 116 in place. In one example, the deployment shock absorber 428 maintains the parachute riser tether 418 as well as the suspension lines 314 in their stored configuration within the parachute chamber 411. Stated another way, the deployment shock absorber 428 prevents (e.g., minimizes or eliminates) the drawing of one or more of the parachute riser tether 418 or the suspension lines 314 into the riser tether chamber 422 and out of the riser feeding orifice 432. Optionally, the deployment shock absorber 428 operates during detachment of the system housing 110 from the atmospheric balloon system 100 and deployment of the riser tether 116. As the system housing 110 descends, it accelerates and accordingly transmits force along the riser tether 116 when the riser tether is fully deployed. The force transmitted along the riser tether 116, in one example, is conveyed without attenuation to each of the parachute riser tether 418 and the suspension lines 314 without the deployment shock absorber 428. The deployment shock absorber 428 and the shock absorber anchor 431 cooperate to substantially prevent the full transmission of forces to either of the parachute riser 418 or the suspension lines 314. The parachute 304 is thereby reliably maintained in the stored configuration within the parachute chamber 411 ready for deployment.

Figure 5A:
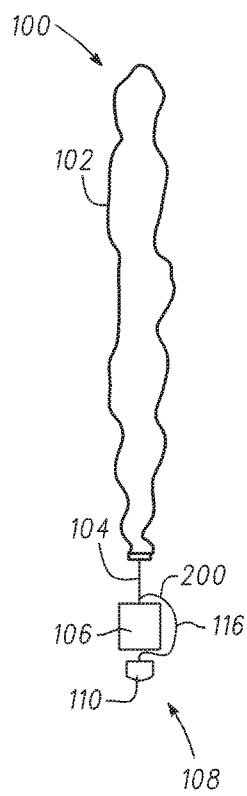
FIG. 5A is a schematic view of the atmospheric balloon system as deflation of the atmospheric balloon begins.

FIGS. 5A-F show one example of the atmospheric balloon system 100 with the descent system 108 in a staggered progression of deployment steps. Referring first to FIG. 5A, the atmospheric balloon system 100 is shown during deflation of the atmospheric balloon 102. The atmospheric balloon system 100 is descending with the atmospheric balloon 102 in a streamlined configuration (or transitioning to the configuration) above the payload 106 and the suspended descent system 108. The atmospheric balloon 102 is coupled with the payload 106 by the suspension lines 104. As shown, the riser tether 116 is coupled with the atmospheric balloon system 100. In one example, a balloon system riser end portion 200 of the riser tether 116 is coupled with the atmospheric balloon system 100 at the payload 106. The riser tether 116 extends around or through the payload 106 to the descent system 108 including the system housing 110. As previously described herein, the system housing 110 is, in one example, coupled with the payload or another feature of the atmospheric balloon system 100 by way of a payload harness 112. The system housing 110 is released from the payload 106 with a release mechanism such as the release mechanism 114 shown in FIGS. 1 and 4.

Figure 5C:
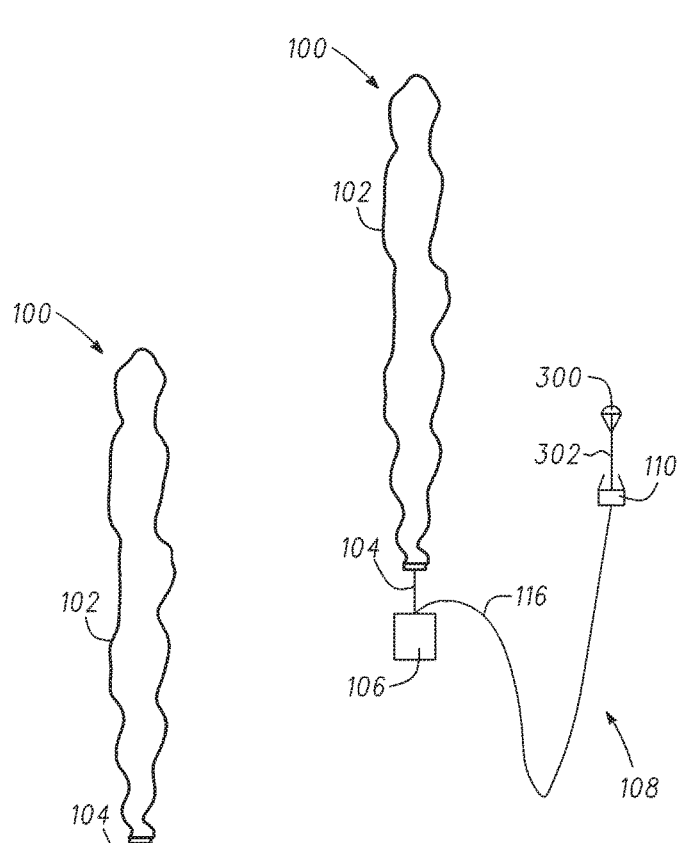
FIG. 5C is a schematic view of the atmospheric balloon system of FIG. 5A with the descent system rising relative to the atmospheric balloon and a payload.
Figure 5B:
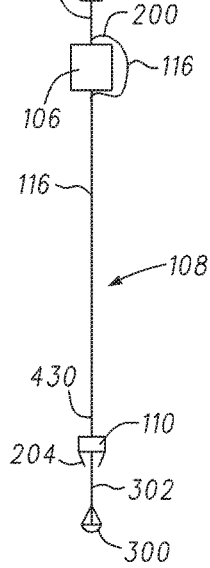
FIG. 5B is a schematic view of the atmospheric balloon system of FIG. 5A with the descent system dropped and a drogue chute deployed.

Referring now to FIG. 5B, the atmospheric balloon system 100 is again shown in a streamlined configuration with the payload 106 and the atmospheric balloon 102 descending through an atmosphere. The system housing 110 is in a released configuration relative to the atmospheric balloon system 100. For instance, the release mechanism 114 has been remotely or automatically operated to accordingly release the system housing 110 from the atmospheric balloon system 100 (e.g., the payload 106). Optionally, the payload 106 includes one or more instruments, sensors, controllers or the like configured to operate the release mechanism 114 in an automatic manner (e.g., according to one or more atmospheric balloon system characteristics including, but not limited to, descent velocity, air pressure or time since initiation of deflation of the atmospheric balloon or the like). The system housing 110 descends relative to the payload 106 and the atmospheric balloon 102 according to drag incident on the atmospheric balloon 102 and remaining buoyancy of the balloon if partially inflated. As shown in FIG. 5B, the system housing 110 descends along the riser tether 116 deployed from the system housing 110. As previously shown, in FIG. 4, in one example, the riser spool 424 is coupled with the system housing 110, for instance, within a riser tether chamber 422. The riser tether 116 feeds from the riser tether chamber 422 through the riser feeding orifice 432 (also shown in FIG. 4). The riser tether 116 continues to deploy from the system housing 110 and allows the system housing 110 to descend to the position shown in FIG. 5B, for instance, a position suspended below the remainder of the atmospheric balloon system 100 including the payload 106 and the deflating atmospheric balloon 102.

As the system housing 110 is dropped or descends relative to the payload 106, a feature of the system housing 110 is triggered to allow deployment of the drogue chute 300. For instance, in one example, the drogue cover 204 is operated to facilitate the opening of the drogue chamber 401 and thereby allow the drogue chute 300 to deploy. Referring back to FIG. 4, the drogue chamber 401, in one example, includes a drogue cover 204 having a plurality of drug flaps 400 closed with a drogue cover closure 402. In one example the drogue cover release 404 coupled with the drogue release pin 403 extends from the drogue cover closure 402 and is coupled with a portion of the riser tether 116. In one example, the drogue cover release 404 is coupled with the descent system riser end portion 430 of the riser tether 116.

As the descent system riser end portion 430 is moved (e.g., drawn through or drawn toward the riser feeding orifice 432) the descent system riser end portion 430 correspondingly moves the drogue cover release 404 to remove the drogue release pin 403 from the drogue cover closure 402. The drogue flaps 400 are thereafter free to open. With the system housing 110 in an inverted configuration relative to that shown in FIG. 4, as the system housing 110 slows its descent (reaches the end or near the end of the riser tether 116) the drogue chute 300 falls from the open drogue chamber 401 into the configuration shown in FIG. 5B.

Referring now to FIG. 5C, the atmospheric balloon system 100 is shown with the descent system 108 rising relative to the atmospheric balloon system 100 (e.g., the atmospheric balloon 102 and the payload 106). The system housing 110 raises according to drag incident on the drogue chute 300 deployed from the system housing 110. As previously described herein, although drag is incident on the drogue chute 300, the parachute 304 remains stored within the system housing 110 and will not deploy until a later stage of deployment with the system housing 110 suspended above the atmospheric balloon 102 and the suspension lines 104 according to spacing provided by the riser tether 116.

FIG. 5D shows the system housing 110 of the descent system 108 in an elevated position relative to the atmospheric balloon 102 and the suspension lines 104. The atmospheric balloon 102 and the payload 106 are not yet subject to the drag from the drogue chute 300 and continue to descend at a faster rate than the system housing 110. The system housing 110 is tethered to the atmospheric balloon system 100 (e.g, the payload 106) by the riser tether 116. Additionally, the riser tether 116 is approaching a fully deployed configuration where the riser tether 116 extends the riser length 500 (see FIG. 5D) between the system housing 110 and the payload 106. With the system housing at the elevated position above the atmospheric balloon 102 the parachute 304 is deployed as shown in FIG. 5E.

Referring now to FIG. 5E, the riser tether 116 is shown in a fully deployed configuration and the parachute 304 is deployed. As previously described, the riser tether 116 feeds from the system housing 110 until the length of the riser tether 116 (e.g., a deployed length) is deployed. As shown, the riser tether 116 has a riser length 502 between the balloon system riser end portion 200 adjacent to the payload 106 and the descent system riser end portion 430 adjacent to the system housing 110. The riser length 502 is greater than a corresponding composite length 500 of the atmospheric balloon system 100. The composite length 500 includes as shown each of the lengths of the atmospheric balloon 102 (in a deflated configuration), the suspension lines 104 and the payload 106.

In the spaced configuration shown in FIG. 5E the parachute 304 is deployed. For instance, as previously described in one example the drogue tether 302 is coupled with one or more features of the descent system 108 including, for instance, one or more of the parachute flaps 410 shown in FIG. 4 with the deployment shock absorber 416 (e.g., rip stitching, separating rivets, hook and loop material or the like). In another example, the deployment shock absorber 416 includes a band of material such as nylon, canvas or the like retaining one or more of the parachute cover closure 412 with the parachute release pin 414 in the closed position shown in FIG. 4. As the riser tether 116 assumes the riser length 502 shown in FIG. 5E, the riser tether 116 experiences a dynamic loading from the descending atmospheric balloon system 100 (e.g., the riser tether 116 is taut and loaded by the falling system 100). The dynamic loading is transmitted through the riser tether 116 to the system housing 110. The dynamic loading in combination with the drag from the drogue chute 300 overcomes the deployment shock absorber 416 (whether one or more shock absorbers 416) and fractures or opens shock absorber 416 to free the parachute chamber 411 to open. The drogue tether 302 in a freed configuration opens the parachute cover closure 412 thereby opening the corresponding parachute cover flaps 410. Drag incident on the drogue tether 302 pulls the parachute 304 from the (opened) parachute chamber 411.

As previously described herein, a deployment sleeve 306 is in one example coupled along the drogue tether 302 and facilitates the staggered deployment of the parachute 304 to ensure the parachute 304 reliably fills once deployed from the system housing 110. For instance, the deployment sleeve 306 (e.g., one or more of a sleeve, diaper, bag or the like) includes the parachute 304 at the closed end of the deployment sleeve while the suspension lines are packed last (nearer to an open end of the deployment sleeve 306). Accordingly, during deployment the suspension lines 314 are first drawn from the deployment sleeve 306 and followed by the parachute canopy 312.

As shown in FIG. 5E, the parachute 304 at the elevated position relative to the atmospheric balloon 102 and its suspension lines 104 is free to deploy and fill in a reliable, consistent fashion without interference from either of the balloon 102 or the suspension lines 104. That is to say, the riser length 502 of the riser tether 116 (greater than the composite length 500) spaces the system housing 110 and the deploying parachute 304 away from the remainder of the atmospheric balloon system 100 including the balloon 102 and the suspension lines 104. By isolating the parachute 304 from these features, the parachute 304 is reliably and consistently deployed and filled to ensure a controlled descent by way of the descent system 108.

Referring now to FIG. 5F, the atmospheric balloon system 100 is shown in a descending configuration with the parachute 304 deployed at the elevated position previously shown in FIG. 5E. For instance, the parachute 304 and other features of the descent system 108 including the system housing 110 and the drogue chute 300 are suspended above the atmospheric balloon system according to the riser tether 116. Both the atmospheric balloon 102 and the payload 106 remain coupled with the descent system 108 and are lowered in a controlled manner through the atmosphere and delivered as a unitary assembly to a landing location. The descent system 108 including the features described herein is thereby able to reliably and consistently deploy and fill a parachute to provide a controlled descent for the entire atmospheric balloon system 100 including the atmospheric balloon 102 and its payload 106.

The descent system 108 (e.g., the parachute 304) is reliably deployed without fouling from other features of the atmospheric balloon system 100 including one or more of the atmospheric balloon 102 and its suspension lines 104 by using the riser tether 116 to space the parachute 304 from the balloon 102 prior to deployment. The drogue chute 300 in combination with the riser tether 116 spaces the parachute 304 in a stored configuration above the atmospheric balloon system 100 prior to deployment. Once the system housing 110 is positioned as shown in FIG. 5E, the drogue chute 300, in combination with forces transmitted along the riser tether 116, frees the parachute 304 (opens the parachute chamber 411) and drag from the drogue chute 300 pulls the parachute 304 from the chamber 411 for filling. (as shown in FIGS. 5E, F).

Figure 6:
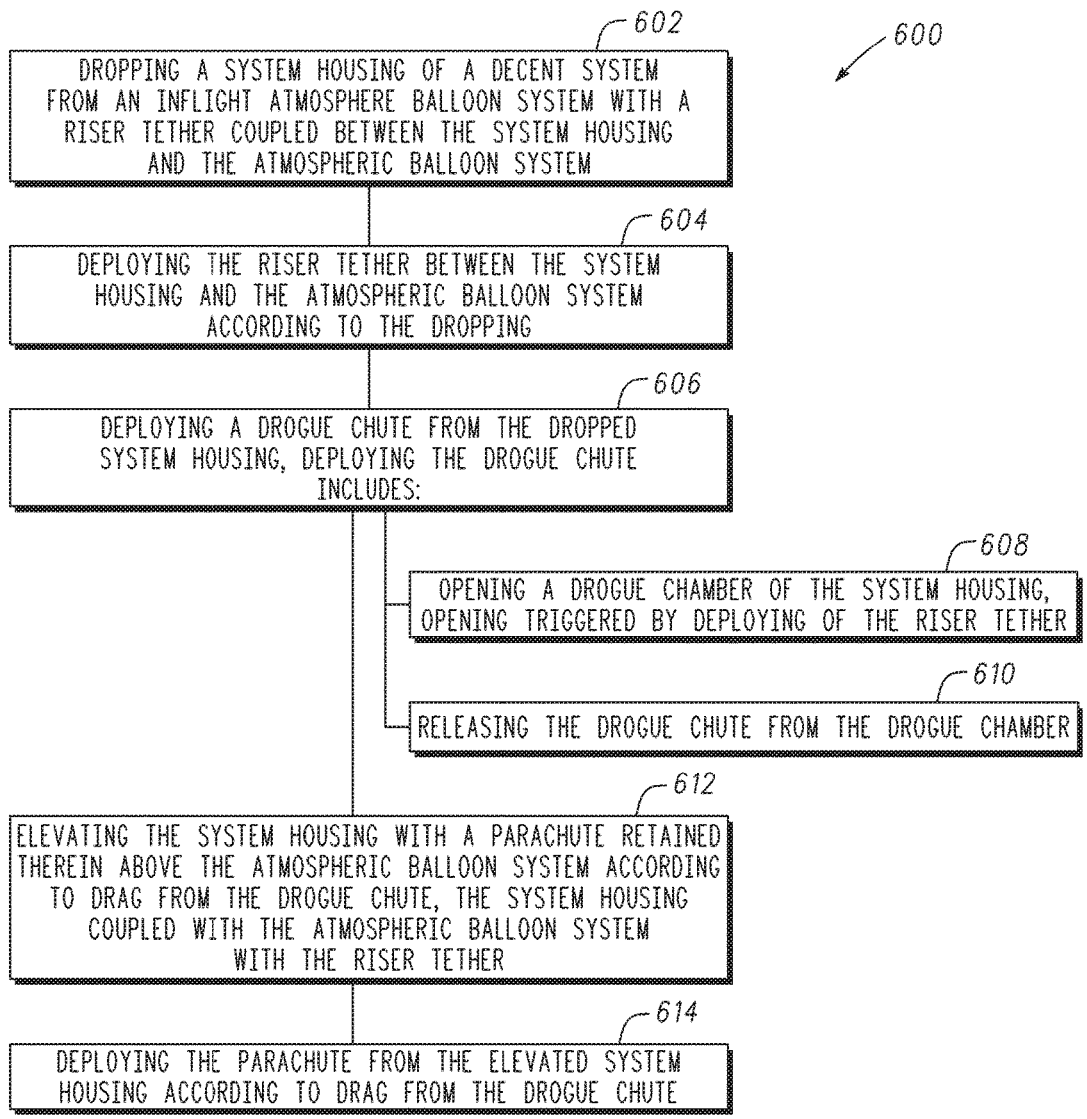
FIG. 6 is a block diagram showing one example of a method of deploying a descent system.

FIG. 6 shows one example of a method 600 for deploying a descent system 108 for an atmospheric balloon system 100. One example of the descent system 108 and the atmospheric balloon system 100 is shown in FIG. 1. In describing the method 600, reference is made to one or more components, features, functions, steps or the like described herein. Where convenient reference is made to the components, features, functions, steps and the like with reference numerals. Reference numerals provided are exemplary and are not exclusive. For instance, the features, components, functions, steps or the like described in the method 600 include, but are not limited to, the corresponding numbered elements, other corresponding features described herein (both numbered and unnumbered) as well as their equivalents.

At 602 the method 600 includes dropping a system housing 110 of the descent system 108 from an inflight atmospheric balloon system 100 with a riser tether 116 coupled between the system housing 110 and the atmospheric balloon system 100. For instance, as shown in FIG. 1, the descent system 108 including, for instance, the system housing 110 is coupled with the payload 106 with a payload harness 112 having a system release mechanism 114. The system release mechanism 114 is, in one example, operated remotely, automatically or the like to accordingly detach or drop the system housing 110 relative to the remainder of the atmospheric balloon system 100.

At 604 the riser tether 116 is deployed between the system housing 110 and the atmospheric balloon system 100 according to the dropping of the system housing 110. For instance, in one example, the riser tether 116 is contained with or in the system housing 110, such as within a riser tether chamber 422 (see FIG. 4). The riser tether 116 is deployed from the riser tether chamber 422 optionally through a riser feeding orifice 432 as the system housing 110 descends relative to the payload 106.

At 606 a drogue chute 300 is deployed from the drop system housing 110. In one example, deploying the drogue chute 300 includes at 608 opening a drogue chamber 401 of the system housing 110. The drogue chamber 401 is, in one example, triggered by deployment of the riser tether 116. As described herein, the riser tether 116 is optionally coupled with a feature near to the descent system riser end portion 430 of the riser tether 116. Coupling of the descent system riser end portion 430 with a corresponding drogue cover release 404 facilitates the operation of a drogue cover closure 402 to open the drogue chamber 401. Stated another way, as the riser tether 116 is deployed from the system housing 110 the descent system riser end portion 430 coupled with the drogue cover release 404 operates the release 404 to accordingly open the drogue chamber 401. As shown in FIG. 5B, in one example, the riser tether 116 and the drogue cover release (not shown in FIG. 5B but shown in FIG. 4) operate the drogue cover release 404 after the riser tether 116 is substantially deployed from the system housing 110, for instance, in the orientation shown in FIG. 5B.

At 610 deploying of the drogue chute 300 includes releasing the drogue chute from the opened drogue chamber 401. For instance, as previously shown in FIG. 5B, the system housing 110 descends on the riser tether 116 from the remainder of the atmospheric balloon system 100. As the system housing 110 slows, for instance after reaching the end or near to the end of the riser tether 116, the drogue chute 300 deploys from the system housing 110 (according to gravity, momentum or the like) and assumes the deployed configuration shown in FIG. 5B.

At 612 the method 600 includes elevating the system housing 110 with the parachute 304 retained therein above the atmospheric balloon system 100 (e.g., including the deflated or deflating atmospheric balloon, the payload and the like). The system housing 110 is elevated relative to the atmospheric balloon system according to drag from the drogue chute 300 shown by way of example in FIGS. 5C, D. Stated another way, the atmospheric balloon system 100 continues to fall while the drag provided by the drogue chute 300 elevates the system housing 110 relative to the atmospheric balloon system 100 while remaining coupled with the atmospheric balloon system with the deployed riser tether 116.

At 614 the method 600 includes deploying the parachute 304 from the elevated system housing 110 according to drag from the drogue chute 300. For instance, as previously described herein in one example, one or more deployment shock absorbers 416 are provided between the drogue chute 300 and the parachute 304. In one example, one or more deployment shock absorbers 416 are provided along the drogue tether 302. The deployment shock absorbers 416 hold the parachute chamber 411 in a closed configuration and thereby retain the parachute 304 within the parachute chamber 411 while the system housing 110 is elevated, for instance, as shown in FIGS. 5C, D. Once the system housing 110 is in an elevated position shown in FIG. 5D and the riser tether 116 goes taut according to the descent of the atmospheric balloon system 100 and drag supplied by the drogue chute 300 to the system housing 110 sufficient force is developed at the deployment shock absorbers 416 to overcome the shock absorbers (break, cause to fail or the like) and thereby release the drogue tether 302 to open the parachute chamber 411. In one example, as shown in FIG. 4, the parachute cover 408 is opened, for instance, with decoupling of a parachute release pin 414 from a parachute cover closure 412 caused by movement of the freed drogue tether 302. Drag from the drogue chute 300 is transmitted to the parachute 304 and deploys the parachute 304 from the open parachute chamber 411. The parachute 304 deploys and fills in the manner shown in FIG. 5E. For instance, the parachute 304 is deployed above and away from the remainder of the atmospheric balloon system 100 according to the riser length 502 provided by the riser tether 116. As shown in FIG. 5B, the riser length 502 is greater than the composite length 500 of the atmospheric balloon 102 in the deflated configuration and the payload 106. Accordingly, at deployment the parachute 304 is elevated above these features and deploys without fouling or interference with either of the atmospheric balloon 102 or its suspension lines 104.

Several options for the method 600 follow. In one example, opening the drogue cover 204 includes actuating a drogue cover release 404 according to deploying of the riser tether 116. The drogue cover release 404 is coupled near a descent system riser end portion 430 of the riser tether 116 and is remote from a balloon system riser end portion 200 of the riser tether 116. As previously described herein, in one example, the balloon system riser end portion 200 is coupled with the atmospheric balloon system 100, for instance, at the payload 106. Opening of the drogue cover 204, in another example, includes unfastening a drogue cover closure 402 with the actuated drogue cover release 404 coupled between the drogue cover closure 402 and the riser tether 116 as shown in FIG. 4.

In another example, deploying the parachute 304 includes opening the parachute chamber 411 of the system housing 110 according to drag from the drogue chute 300 while the system housing 110 is elevated. The parachute 304 is released from the parachute chamber 411 according to the drag from the drogue chute 300 while the system housing is elevated (and open). As previously described herein, in one example, opening of the parachute chamber 411 and subsequent releasing of the parachute 304 from the system housing 110 is, in one example, staggered (relative to deployment of the drogue chute 300) by way of one or more features interposed between the drogue chute 300 and the parachute 304. Examples of these features are shown in FIG. 4 and include one or more deployment shock absorbers 416 that arrest the transmission of forces from the drogue chute 300 to the parachute 304 or opening of the parachute chamber 411. With sufficient force (e.g., at or above a specified threshold for drag force, dynamic shock force or the like), the deployment shock absorbers 416 are overcome (caused to fail, fractured or the like) and the drogue chute 300 at the elevated position shown in FIGS. 5D and 5E deploys the parachute 304 from the opened parachute chamber 411.

In another example, dropping the system housing 110 includes measuring at least one atmospheric balloon system characteristic including one or more of descent velocity, air pressure or time since initiation of deflation of the atmospheric balloon 102. Dropping the system housing 110 further includes initiating dropping of the housing according to the measured at least one atmospheric balloon system characteristic. For instance, the one or more characteristics are compared with specified thresholds and upon reaching or exceeding those thresholds the system housing 110 is detached from the atmospheric balloon system 100 and freed to drop relative to the system 100 while remaining tethered with the riser tether 116.

In another example, the riser tether 116 is coupled with the system housing 110. For instance, the riser tether 116 is coupled within the system housing 110 within a riser tether chamber 422. The riser tether 116 is deployed from the system housing through a riser feeding orifice 432 (FIG. 4) according to the dropping of the system housing 110 from the atmospheric balloon system 100. Optionally, the riser feeding orifice 432 is configured (e.g., dimensioned) to throttle deployment of the riser tether 116 and thereby control the descent of the system housing 110 relative to the atmospheric balloon system 100.

In another example, the riser tether 116 is coupled along the system housing 110 and deployed from the system housing by unwrapping, unspooling or the like from the stored position on the system housing 110. In yet another example, the riser tether 116 is coupled with another portion of the atmospheric balloon system 100. For instance, the riser tether 116 is coupled in a stored configuration with the payload 106 and the opposed end of the riser tether 116 is coupled with the descent system 108. In such an example, the riser tether 116 deploys in substantially the same manner but instead of deploying from the system housing 110 the tether deploys from the atmospheric balloon system 100. For instance, in one example, the riser tether 116 is provided in a riser spool similar to the riser spool 424 on the payload 106. As the system housing 110 is detached from the atmospheric balloon system 100, the system housing descends and the riser tether 116 is fed from the riser spool 424 retained with the payload 106. In other regards, the descent system 108 including a riser tether 116 stored on the payload 106 operates in substantially a similar manner to that previously described herein.

Various Notes & Examples

Example 1 can include subject matter, such as can include a method for deploying a descent system from a drop vehicle system, the method comprising: pulling a ripcord to release a drogue parachute of the descent system; inflating the drogue parachute to deploy the descent system from the drop vehicle system; deploying a primary parachute from a primary parachute chamber of the deployed descent system; and inflating the deployed primary parachute to decrease a descent rate of the drop vehicle system.

Example 2 can include, or can optionally be combined with the subject matter of Example 1, to optionally include further comprising, prior to pulling the ripcord, dispensing at least a substantial portion of a length of a riser from the descent system.

Example 3 can include, or can optionally be combined with the subject matter of one or any combination of Examples 1 or 2 to optionally include wherein further comprising, after inflating the drogue parachute, dispensing at least a substantial portion of a length of a riser from the descent system.

Example 4 can include, or can optionally be combined with the subject matter of one or any combination of Examples 1-3 to optionally include wherein further comprising evacuating lift gas from a drop vehicle of the drop vehicle system to increase a first rate of descent of the drop vehicle system.

Example 5 can include, or can optionally be combined with the subject matter of one or any combination of Examples 1-4 to optionally include wherein further comprising, prior to releasing the primary chute, increasing drag of the drop vehicle system to open the primary parachute chamber.

Example 6 can include, or can optionally be combined with the subject matter of Examples 1-5 to optionally include wherein inflating the released primary parachute is done with at least one of a deployment sleeve, a bag, and a diaper.

Example 7 can include, or can optionally be combined with the subject matter of Examples 1-6 to optionally include wherein inflating the released primary parachute is done without a deployment sleeve, a bag, and a diaper.

Example 8 can include, or can optionally be combined with the subject matter of Examples 1-7 to optionally include wherein deploying the descent system includes deploying the descent system from the drop vehicle.

Example 9 can include, or can optionally be combined with the subject matter of Examples 1-8 to optionally include wherein deploying the pack tray includes deploying the descent system from the payload.

Example 10 can include, or can optionally be combined with the subject matter of Examples 1-9 to optionally include wherein the drop vehicle is an atmospheric balloon.

Example 11 can include, or can optionally be combined with the subject matter of Examples 1-10 to optionally include the subject matter wherein a method for decelerating a balloon-payload system, the method comprising: at least partially deflating an atmospheric balloon to trigger descent of the balloon-payload system; pulling a ripcord to deploy a drogue parachute from a descent system of the balloon-payload system; inflating the drogue parachute to deploy the descent system from the balloon-payload system; deploying a primary parachute from a primary parachute chamber of the deployed descent system; and inflating the deployed primary parachute to decelerate a descent of the drop vehicle system.

Example 12 can include, or can optionally be combined with the subject matter of Examples 1-11 to optionally include wherein further comprising, prior to pulling the ripcord, dispensing at least a substantial portion of a length of a riser from the descent system.

Example 13 can include, or can optionally be combined with the subject matter of Examples 1-12 to optionally include wherein further comprising, after inflating the drogue parachute, dispensing at least a substantial portion of a length of a riser from the descent system.

Example 14 can include, or can optionally be combined with the subject matter of Examples 1-13 to optionally include wherein deploying the descent system includes deploying the dispense system from the atmospheric balloon.

Example 15 can include, or can optionally be combined with the subject matter of Examples 1-14 to optionally include wherein deploying the descent system includes deploying the descent system from the payload.

Example 16 can include, or can optionally be combined with the subject matter of Examples 1-15 to optionally include wherein further comprising opening the primary parachute chamber at a threshold drag of the balloon-payload system.

Example 17 can include, or can optionally be combined with the subject matter of Examples 1-16 to optionally include wherein further comprising maintaining the balloon-payload system as a single system at least until the balloon-payload system lands at a recovery location.

Example 18 can include, or can optionally be combined with the subject matter of Examples 1-17 to optionally include the subject matter wherein a method for packing a descent system, the method comprising: inserting a rolled riser within a housing; covering the rolled riser with a riser cover; inserting a primary parachute over the riser cover; closing a primary parachute chamber with a closing pin and a break line; inserting a drogue parachute into a drogue parachute chamber; closing the drogue parachute chamber; and securing the housing with the drogue and primary parachutes with a ripcord.

Example 19 can include, or can optionally be combined with the subject matter of Examples 1-18 to optionally include wherein further comprising routing the ripcord through the housing prior to inserting the rolled riser.

Example 20 can include, or can optionally be combined with the subject matter of Examples 1-19 to optionally include wherein further comprising routing the ripcord through the housing after covering the rolled riser with the riser cover.

Example 21 can include, or can optionally be combined with the subject matter of Examples 1-20 to optionally include the subject matter wherein a drop vehicle system, comprising: a drop vehicle;

a payload coupled to the drop vehicle; and a descent system coupled to at least one of the drop vehicle and the payload, the descent system including: a housing having at least a drogue parachute, a primary parachute, and a riser, and a ripcord securing the housing.

Example 22 can include, or can optionally be combined with the subject matter of Examples 1-21 to optionally include wherein the ripcord, the riser, the drogue parachute, and the primary parachute are packed in the housing to form the descent system.

Example 23 can include, or can optionally be combined with the subject matter of Examples 1-22 to optionally include wherein the riser is a rolled riser packed in the housing.

Example 24 can include, or can optionally be combined with the subject matter of Examples 1-23 to optionally include wherein the riser includes a payload end configured for coupling to the payload and a primary parachute end configured for coupling to the primary parachute, wherein the payload end and primary parachute end are opposed ends of the riser.

Example 25 can include, or can optionally be combined with the subject matter of Examples 1-24 to optionally include wherein the ripcord is coupled to the riser.

Example 26 can include, or can optionally be combined with the subject matter of Examples 1-25 to optionally include wherein the descent system includes a riser cover disposed at least partially between the riser and the primary parachute.

Example 27 can include, or can optionally be combined with the subject matter of Examples 1-26 to optionally include wherein the primary parachute includes at least one of a deployment sleeve, a bag, and a diaper.

Example 28 can include, or can optionally be combined with the subject matter of Examples 1-27 to optionally include wherein the descent system includes a primary parachute chamber.

Example 29 can include, or can optionally be combined with the subject matter of Examples 1-28 to optionally include wherein the primary parachute chamber is configured to be closed with a closing pin and a break line.

Example 30 can include, or can optionally be combined with the subject matter of Examples 1-29 to optionally include wherein the descent system includes a drogue parachute chamber configured to be closed with one or more loops, wherein the ripcord is fed through at least one of the one or more loops when the drogue parachute chamber is closed.

Example 31 can include, or can optionally be combined with the subject matter of Examples 1-30 to optionally include wherein the housing includes a channel configured to at least partially receive the ripcord.

Example 32 can include, or can optionally be combined with the subject matter of Examples 1-31 to optionally include wherein the housing includes an orifice for releasing of the riser from the descent system.

Example 33 can include, or can optionally be combined with the subject matter of Examples 1-32 to optionally include an atmospheric balloon descent system comprising: a system housing including a drogue chamber and a parachute chamber, the system housing includes: a drogue cover, the drogue cover configured to open the drogue chamber, and a parachute cover, the parachute cover configured to open the parachute chamber; a drogue chute within the drogue chamber; a parachute within the parachute chamber, the parachute coupled with the drogue chute with a drogue tether; and a riser tether assembly coupled with the parachute, the riser tether assembly includes: a riser tether extending between a descent system end portion and a balloon system end portion, the desctent system end portion coupled with the parachute, and a drogue cover release coupled between the riser tether and the drogue cover.

Example 34 can include, or can optionally be combined with the subject matter of Examples 1-33 to optionally include wherein the drogue cover release is a rip cord having first and second rip cord end portions, the first rip cord end portion is coupled with the riser tether, and the second rip cord end portion is coupled with the drogue cover.

Example 35 can include, or can optionally be combined with the subject matter of Examples 1-34 to optionally include wherein the first rip cord end portion is coupled near the first riser portion and the first rip cord end portions is remote from the second riser portion.

Example 36 can include, or can optionally be combined with the subject matter of Examples 1-35 to optionally include a payload harness assembly including: a payload harness coupled with the system housing, the payload harness is configured to couple the descent system with an atmospheric balloon system, and a system release mechanism configured to open the payload harness and decouple the atmospheric balloon descent system from the atmospheric balloon system.

Example 37 can include, or can optionally be combined with the subject matter of Examples 1-36 to optionally include the atmospheric balloon system, and the atmospheric balloon system includes one or more of an atmospheric balloon or a payload, and the balloon system end portion of the riser tether is coupled with the atmospheric balloon system.

Example 38 can include, or can optionally be combined with the subject matter of Examples 1-37 to optionally include wherein the drogue cover includes a plurality of drogue flaps spread across the drogue chamber and covering the drogue chute, and the plurality of drogue flaps are closed with a fastened drogue cover closure.

Example 39 can include, or can optionally be combined with the subject matter of Examples 1-38 to optionally include wherein the drogue cover release is coupled with the fastened drogue cover closure, and the drogue cover release is configured to unfasten the drogue cover closure.

Example 40 can include, or can optionally be combined with the subject matter of Examples 1-39 to optionally include wherein the parachute cover includes a plurality of parachute flaps spread across the parachute chamber and covering the parachute, and the plurality of parachute flaps are closed with a fastened parachute cover closure.

Example 41 can include, or can optionally be combined with the subject matter of Examples 1-40 to optionally include wherein the drogue tether is coupled with the fastened parachute cover closure, and the drogue tether is configured to unfasten the drogue cover closure.

Example 42 can include, or can optionally be combined with the subject matter of Examples 1-41 to optionally include wherein the parachute cover is interposed between the drogue chute and the parachute.

Example 43 can include, or can optionally be combined with the subject matter of Examples 1-42 to optionally include wherein the system housing includes a riser tether chamber containing the riser tether, and the balloon system end portion of the riser tether extends out of the system housing through a riser feeding orifice.

Example 44 can include, or can optionally be combined with the subject matter of Examples 1-43 to optionally include at least one deployment shock absorber coupled along one or more of the drogue tether or the riser tether.

Example 45 can include, or can optionally be combined with the subject matter of Examples 1-44 to optionally include wherein the drogue chute is stacked over the parachute and the parachute is stacked over the riser tether, the riser tether in a spooled configuration.

Example 46 can include, or can optionally be combined with the subject matter of Examples 1-45 to optionally include an atmospheric balloon descent system comprising: a system housing configured for coupling with an atmospheric balloon system, the system housing includes: a drogue chamber, and a parachute chamber, a drogue chute within the drogue chamber; a parachute within the parachute chamber, the parachute coupled with the drogue chute with a drogue tether; a riser tether stored with the system housing, a descent system end portion of the riser tether coupled with the parachute and a balloon system end portion of the riser tether configured for coupling with an atmospheric balloon system; and wherein the descent system is configured to transition between riser deployment and parachute deployment configurations: in the riser deployment configuration the system housing is decoupled from the atmospheric balloon system and the riser tether is deployed between the system housing and the atmospheric balloon system, and in the parachute deployment configuration the deployed riser tether is configured to open the drogue chamber and deploy the drogue chute and the deployed drogue chute is configured to open the parachute chamber and deploy the parachute.

Example 47 can include, or can optionally be combined with the subject matter of Examples 1-46 to optionally include wherein the riser tether is stored within the system housing, and in the riser deployment configuration the riser tether is drawn from the system housing through a riser feeding orifice.

Example 48 can include, or can optionally be combined with the subject matter of Examples 1-47 to optionally include a drogue cover release coupled with the riser tether and the drogue cover.

Example 49 can include, or can optionally be combined with the subject matter of Examples 1-48 to optionally include wherein in the parachute deployment configuration the deployed riser tether is configured to actuate the drogue cover release and the actuated drogue cover release is configured to open the drogue chamber.

Example 50 can include, or can optionally be combined with the subject matter of Examples 1-49 to optionally include wherein the drogue tether is coupled with the parachute chamber, and in the parachute deployment configuration the deployed drogue chute is configured to open the parachute chamber with the drogue tether.

Example 51 can include, or can optionally be combined with the subject matter of Examples 1-50 to optionally include a payload harness assembly including: a payload harness coupled with the system housing, the payload harness is configured to couple the descent system with the atmospheric balloon system, and a system release mechanism configured to open the payload harness and decouple the atmospheric balloon descent system from the atmospheric balloon system.

Example 52 can include, or can optionally be combined with the subject matter of Examples 1-51 to optionally include at least one deployment shock absorber coupled along one or more of the drogue tether or the riser tether.

Example 53 can include, or can optionally be combined with the subject matter of Examples 1-52 to optionally include wherein the drogue chute is stacked over the parachute and the parachute is stacked over the riser tether stored with the system housing.

Example 54 can include, or can optionally be combined with the subject matter of Examples 1-53 to optionally include the atmospheric balloon system, and the atmospheric balloon system includes one or more of an atmospheric balloon or a payload, and the balloon system end portion is coupled with the atmospheric balloon system.

Example 55 can include, or can optionally be combined with the subject matter of Examples 1-54 to optionally include wherein the riser tether has a deployed length in the riser deployment configuration greater than a composite length of the atmospheric balloon system with the atmospheric balloon deflated.

Example 56 can include, or can optionally be combined with the subject matter of Examples 1-55 to optionally include an atmospheric balloon system comprising: an atmospheric balloon; a payload coupled with the atmospheric balloon; and an atmospheric balloon descent system coupled with the payload with a payload harness, the atmospheric balloon descent system includes: a drogue chamber containing a drogue chute, a parachute chamber containing a parachute, the parachute coupled with the drogue chute with a drogue tether, a riser tether including a descent system end portion coupled with the parachute and a balloon system end portion coupled with the payload, and wherein the atmospheric balloon descent system is configured to transition between riser deployment and parachute deployment configurations: in the riser deployment configuration the atmospheric balloon descent system is decoupled from the payload at the payload harness, and the riser tether is deployed between the payload and the drogue and parachute chambers, the deployed riser tether has a deployed length greater than a composite length from the payload to an upper apex of the atmospheric balloon in a deflated configuration, and in the parachute deployment configuration the deployed riser tether is configured to open the drogue chamber and deploy the drogue chute and the deployed drogue chute is configured to open the parachute chamber and deploy the parachute at the deployed length of the riser tether relative to the payload and the atmospheric balloon.

Example 57 can include, or can optionally be combined with the subject matter of Examples 1-56 to optionally include wherein the riser tether is stored within the system housing, and in the riser deployment configuration the riser tether is drawn from the system housing through a riser feeding orifice.

Example 58 can include, or can optionally be combined with the subject matter of Examples 1-57 to optionally include a drogue cover release coupled with the riser tether and a drogue cover closing the drogue chamber.

Example 59 can include, or can optionally be combined with the subject matter of Examples 1-58 to optionally include wherein in the parachute deployment configuration the deployed riser tether is configured to actuate the drogue cover release and the actuated drogue cover release is configured to open the drogue chamber.

Example 60 can include, or can optionally be combined with the subject matter of Examples 1-59 to optionally include wherein the drogue tether is coupled with the parachute chamber, and in the parachute deployment configuration the deployed drogue chute is configured to open the parachute chamber with the drogue tether.

Example 61 can include, or can optionally be combined with the subject matter of Examples 1-60 to optionally include a system release mechanism configured to open the payload harness and decouple the atmospheric balloon descent system from the payload.

Example 62 can include, or can optionally be combined with the subject matter of Examples 1-61 to optionally include at least one deployment shock absorber coupled along one or more of the drogue tether or the riser tether.

Example 63 can include, or can optionally be combined with the subject matter of Examples 1-62 to optionally include wherein the drogue chute is stacked over the parachute and the parachute is stacked over the riser tether, and each of the drogue chute, the parachute and the riser tether are stored within a system housing.

Example 64 can include, or can optionally be combined with the subject matter of Examples 1-63 to optionally include a method for deploying a descent system for an atmospheric balloon system comprising: dropping a system housing of the descent system from an inflight atmospheric balloon system with a riser tether coupled between the system housing and the atmospheric balloon system; deploying the riser tether between the system housing and the atmospheric balloon system according to the dropping; deploying a drogue chute from the dropped system housing, deploying the drogue chute includes: opening a drogue chamber of the system housing, opening triggered by deploying of the riser tether, and releasing the drogue chute from the drogue chamber according to the dropping; elevating the system housing with a parachute retained therein above the atmospheric balloon system including a deflated atmospheric balloon according to drag from the drogue chute, the system housing coupled with the atmospheric balloon system with the riser tether; and deploying the parachute from the elevated system housing according to drag from the drogue chute.

Example 65 can include, or can optionally be combined with the subject matter of Examples 1-64 to optionally include wherein opening the drogue chamber includes opening a drogue cover, opening triggered by deploying of the riser tether.

Example 66 can include, or can optionally be combined with the subject matter of Examples 1-65 to optionally include wherein opening the drogue cover includes: actuating a drogue cover release according to deploying of the riser tether, the drogue cover release coupled near a descent system end portion of the riser tether and remote from a balloon system end portion of the riser tether, and unfastening a drogue cover closure with the actuated drogue cover release coupled between the drogue cover closure and the riser tether.

Example 67 can include, or can optionally be combined with the subject matter of Examples 1-66 to optionally include wherein deploying the parachute includes: opening a parachute chamber of the system housing according to the drag from the drogue chute while the system housing is elevated, and releasing the parachute from the parachute chamber according to the drag from the drogue chute while the system housing is elevated.

Example 68 can include, or can optionally be combined with the subject matter of Examples 1-67 to optionally include wherein dropping the system housing includes decoupling the system housing from the inflight atmospheric balloon system with a system release mechanism.

Example 69 can include, or can optionally be combined with the subject matter of Examples 1-68 to optionally include wherein dropping the system housing includes: measuring at least one atmospheric balloon system characteristic including one or more of descent velocity, air pressure, or time since initiation of deflation of the atmospheric balloon, and initiating dropping of the system housing according to the measured at least one atmospheric balloon system characteristic.

Example 70 can include, or can optionally be combined with the subject matter of Examples 1-69 to optionally include retaining the parachute in the system housing with a parachute cover closing the parachute chamber until the system housing is elevated above the atmospheric balloon system including the deflated atmospheric balloon.

Example 71 can include, or can optionally be combined with the subject matter of Examples 1-70 to optionally include wherein elevating the system housing includes spacing the system housing from the atmospheric balloon system according to a deployed length of the riser tether.

Example 72 can include, or can optionally be combined with the subject matter of Examples 1-71 to optionally include wherein deploying the riser tether includes feeding the riser tether through a riser feeding orifice of the system housing according to the dropping.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third." etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An atmospheric balloon descent system comprising:
    a system housing including a drogue chamber and a parachute chamber, the system housing includes:
        a drogue cover, the drogue cover configured to open the drogue chamber, and
        a parachute cover, the parachute cover configured to open the parachute chamber;
    a drogue chute within the drogue chamber;
    a parachute within the parachute chamber, the parachute coupled with the drogue chute with a drogue tether; and
    a riser tether assembly coupled with the parachute, the riser tether assembly includes:
        a riser tether extending between a descent system end portion and a balloon system end portion, the descent system end portion coupled with the parachute, and
        a drogue cover release coupled between the riser tether and the drogue cover.

2. The system of claim 1, wherein the drogue cover release is a rip cord having first and second rip cord end portions, the first rip cord end portion is coupled with the riser tether, and the second rip cord end portion is coupled with the drogue cover.

3. The system of claim 2, wherein the first rip cord end portion is coupled near the first riser portion and the first rip cord end portions is remote from the second riser portion.

4. The system of claim 1 comprising a payload harness assembly including:
    a payload harness coupled with the system housing, the payload harness is configured to couple the descent system with an atmospheric balloon system, and
    a system release mechanism configured to open the payload harness and decouple the atmospheric balloon descent system from the atmospheric balloon system.

5. The system of claim 4 comprising the atmospheric balloon system, and the atmospheric balloon system includes one or more of an atmospheric balloon or a payload, and the balloon system end portion of the riser tether is coupled with the atmospheric balloon system.

6. The system of claim 1, wherein the drogue cover includes a plurality of drogue flaps spread across the drogue chamber and covering the drogue chute, and the plurality of drogue flaps are closed with a fastened drogue cover closure.

7. The system of claim 6, wherein the parachute cover includes a plurality of parachute flaps spread across the parachute chamber and covering the parachute, and the plurality of parachute flaps are closed with a fastened parachute cover closure.

8. The system of claim 7, wherein the drogue tether is coupled with the fastened parachute cover closure, and the drogue tether is configured to unfasten the drogue cover closure.

9. The system of claim 1, wherein the system housing includes a riser tether chamber containing the riser tether, and the balloon system end portion of the riser tether extends out of the system housing through a riser feeding orifice.

10. The system of claim 1 comprising at least one deployment shock absorber coupled along one or more of the drogue tether or the riser tether.

11. An atmospheric balloon descent system comprising:
a system housing configured for coupling with an atmospheric balloon system, the system housing includes:
  a drogue chamber, and
  a parachute chamber;
a drogue chute within the drogue chamber;
a parachute within the parachute chamber, the parachute coupled with the drogue chute with a drogue tether;
a riser tether stored with the system housing, a descent system end portion of the riser tether coupled with the parachute and a balloon system end portion of the riser tether configured for coupling with an atmospheric balloon system; and
wherein the descent system is configured to transition between riser deployment and parachute deployment configurations:
  in the riser deployment configuration the system housing is decoupled from the atmospheric balloon system and the riser tether is deployed between the system housing and the atmospheric balloon system, and
  in the parachute deployment configuration the deployed riser tether is configured to open the drogue chamber and deploy the drogue chute and the deployed drogue chute is configured to open the parachute chamber and deploy the parachute.

12. The system of claim 11 comprising a drogue cover release coupled with the riser tether and the drogue cover.

13. The system of claim 12, wherein in the parachute deployment configuration the deployed riser tether is configured to actuate the drogue cover release and the actuated drogue cover release is configured to open the drogue chamber.

14. The system of claim 11, wherein the drogue tether is coupled with the parachute chamber, and in the parachute deployment configuration the deployed drogue chute is configured to open the parachute chamber with the drogue tether.

15. The system of claim 11 comprising a payload harness assembly including:
a payload harness coupled with the system housing, the payload harness is configured to couple the descent system with the atmospheric balloon system, and
a system release mechanism configured to open the payload harness and decouple the atmospheric balloon descent system from the atmospheric balloon system.

16. The system of claim 11 comprising at least one deployment shock absorber coupled along one or more of the drogue tether or the riser tether.

17. The system of claim 11 comprising the atmospheric balloon system, and the atmospheric balloon system includes one or more of an atmospheric balloon or a payload, and the balloon system end portion is coupled with the atmospheric balloon system.

18. The system of claim 17, wherein the riser tether has a deployed length in the riser deployment configuration greater than a composite length of the atmospheric balloon system with the atmospheric balloon deflated.

19. A method for deploying a descent system for an atmospheric balloon system comprising:
dropping a system housing of the descent system from an inflight atmospheric balloon system with a riser tether coupled between the system housing and the atmospheric balloon system;
deploying the riser tether between the system housing and the atmospheric balloon system according to the dropping;
deploying a drogue chute from the dropped system housing, deploying the drogue chute includes:
  opening a drogue chamber of the system housing, opening triggered by deploying of the riser tether, and
  releasing the drogue chute from the drogue chamber according to the dropping;
elevating the system housing with a parachute retained therein above the atmospheric balloon system including a deflated atmospheric balloon according to drag from the drogue chute, the system housing coupled with the atmospheric balloon system with the riser tether; and
deploying the parachute from the elevated system housing according to drag from the drogue chute.

20. The method of claim 19, wherein opening the drogue chamber includes opening a drogue cover, opening triggered by deploying of the riser tether.

21. The method of claim 20, wherein opening the drogue cover includes:
actuating a drogue cover release according to deploying of the riser tether, the drogue cover release coupled near a descent system end portion of the riser tether and remote from a balloon system end portion of the riser tether, and
unfastening a drogue cover closure with the actuated drogue cover release coupled between the drogue cover closure and the riser tether.

22. The method of claim 19, wherein deploying the parachute includes:
opening a parachute chamber of the system housing according to the drag from the drogue chute while the system housing is elevated, and
releasing the parachute from the parachute chamber according to the drag from the drogue chute while the system housing is elevated.

23. The method of claim 19, wherein dropping the system housing includes:
measuring at least one atmospheric balloon system characteristic including one or more of descent velocity, air pressure, or time since initiation of deflation of the atmospheric balloon, and
initiating dropping of the system housing according to the measured at least one atmospheric balloon system characteristic.

24. The method of claim 19 comprising retaining the parachute in the system housing with a parachute cover closing the parachute chamber until the system housing is elevated above the atmospheric balloon system including the deflated atmospheric balloon.

25. The method of claim 19, wherein elevating the system housing includes spacing the system housing from the atmospheric balloon system according to a deployed length of the riser tether.

* * * * *